April 13, 1926. 1,580,736

T. McL. KERR

AUTOMOBILE SIGNAL

Filed March 9, 1925

Inventor

Thomas McLeod Kerr:

By Clarence O'Brien

Attorney

Patented Apr. 13, 1926.

1,580,736

UNITED STATES PATENT OFFICE.

THOMAS McLEOD KERR, OF WORTHINGTON, PENNSYLVANIA.

AUTOMOBILE SIGNAL.

Application filed March 9, 1925. Serial No. 14,194.

*To all whom it may concern:*

Be it known that I, THOMAS McLEOD KERR, a citizen of the United States, residing at Worthington, in the county of Armstrong and State of Pennsylvania, have invented certain new and useful Improvements in an Automobile Signal, of which the following is a specification.

This invention relates to improvements in automobile signals and has for its principal object to provide a simple and efficient device which may be readily and easily secured in position on an automobile whereby the operator may actuate the signal so as to warn pursuing vehicles of the direction to be taken by the vehicle on which the signal is mounted.

One of the important objects of the present invention is to provide an automobile signal of the above mentioned character, wherein the operating means therefor is disposed within easy access of the operator, thus obviating the necessity of the operator having to place his hand outside of the car in order to give the proper signal when a turn or stop is to be made.

A further object is to provide an automobile signal of the above mentioned character, which includes a rotatable member mounted in a stationary casing, the latter having an opening therein for rendering the signalling means visible to the operator of the vehicle as well as the operator of pursuing vehicles. The signal being adapted to be readily visible either at night or during the day time.

A still further object is to provide an automobile signal of the above mentioned character, which is simple in construction, inexpensive, strong and durable and further well adapted for the purposes for which it is designed.

Other objects and advantages of this invention will become apparent during the course of the following description.

In the accompanying drawing forming a part of this specification and in which like numerals designate like parts throughout the same:

Figure 1:
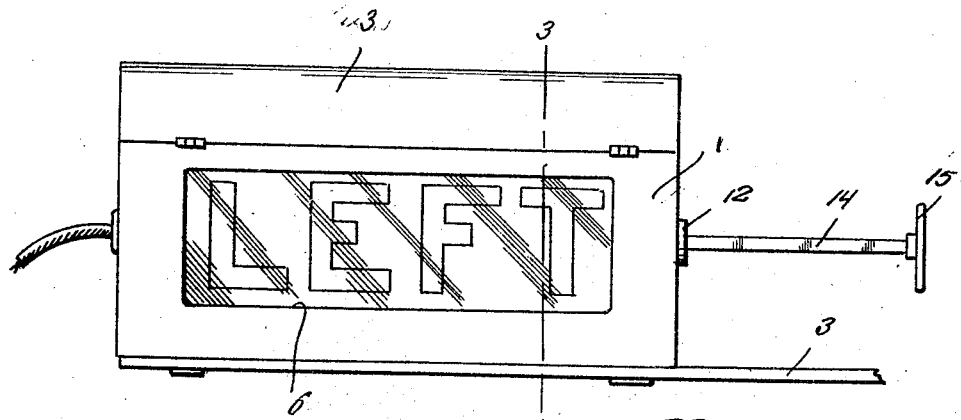
Figure 1 is a front elevation of the automobile signal embodying my invention.

In the drawing wherein for the purpose of illustration is shown the preferred embodiment of my invention, the numeral 1 designates a substantially rectangular casing or housing, the same being open at its top, a hinged cover 2 is provided for the open top of the casing, the casing 1 is adapted to be supported on the outside of an automobile adjacent the windshield frame thereof and a bracket such as is shown at 3 provides a means whereby the signal casing is supported on the automobile. The inner end of the bracket may be secured to the automobile in any suitable manner. The ends of the casing are provided with central registering openings and extending inwardly from the ends around said openings are the sleeves 4 and 5 respectively.

The rear face or side of the casing is provided with a rectangular opening 6, the same being covered by the transparent glass panel 7. The purpose of the opening and glass covering therefor will hereinafter be more fully described.

Figure 3:
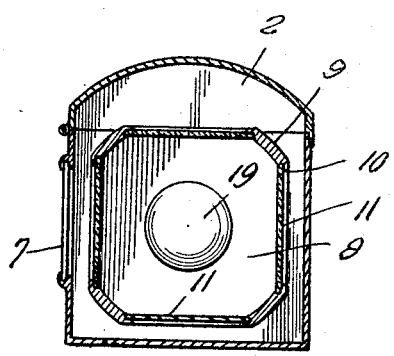
Figure 3 is a sectional view taken approximately on line 3—3 of Figure 1.

Adapted for rotation within the casing 1 is a signalling drum designated generally by the numeral 8. The same is substantially rectangular in cross section and the corners thereof being slightly rounded as illustrated at 9. Each face of the substantially rectangular drum is provided with an opening 10 and supported therein is the glass panel 11. One of the glass panels has painted or otherwise formed thereon the word "Left", another of the panels 11 is marked "Right", another panel is marked "Stop", and the other panel is marked "Ahead". The openings in the faces or sides of the rectangular drum 8 cooperate with the opening 6 provided in the rear face or side of the casing 1 for displaying one of the signalling panels 11 at a time as is clearly illustrated in Figures 1 and 3.

A trunnion 12 is associated with the inner end of the drum 8 and is disposed within the sleeve 4. The trunnion 12 is provided with a substantially rectangular central bore 13 through which extends the substantially rectangular shaft 14, the inner end thereof being received within a suitable rectangular opening provided therefor in the inner end of the drum 8. The opposite end of the shaft is provided with an operating handle 15.

Figure 2:
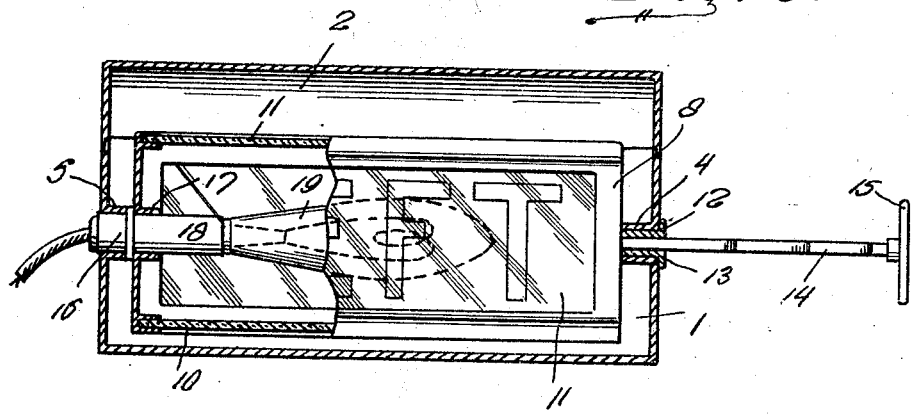
Figure 2 is a longitudinal sectional view through the casing, the rotatable signal member being shown partly in section and partly in elevation.

A trunnion 16 is supported within the sleeve 5 and a similar sleeve 17 which extends inwardly from the outer end of the drum 8 in the manner clearly illustrated in Figure 2. The trunnion 16 furthermore provides a means for receiving and supporting a suitable electric lamp socket, an electric lamp or bulb 19 being supported by the socket and disposed within the drum whereby the signal may be illuminated for rendering the panels 11 visible at night.

The drum 8 is actuated by the operator rotating the handle 15 in either direction so that the panel 11 bearing a proper signalling indicia will be displayed in registry with the panel 7 and the opening 6 formed in the rear face of the casing. The operator of the vehicle may readily see the panel which is in view through the opening in the rear face of the casing so as to ascertain whether or not the proper signal is being given. In this manner, pursuing vehicles may be advised of the direction or course to be followed by the vehicle on which the signal is mounted and thus avoid collisions and accidents which ordinarily result due to confusion in making turns in different directions.

By rounding the corners of the substantially rectangular drum 8, the latter is free to rotate within the casing without coming in contact with the side of the latter. Access to the interior of the casing and to the rotary drum may be had by opening the cover 2 which is hingedly associated with the casing.

The simplicity in which my improved signal is constructed enables the same to be readily and easily installed in position on the side of an automobile and the operating means therefor is located in such a manner as to enable the operator of the vehicle to readily actuate the signal from the inside of the automobile, thus obviating the necessity of having to place his hand on the outside of the automobile.

While I have shown the preferred embodiment of my invention, it is to be understood that various changes in the size, shape and arrangement of parts may be resorted to without departing from the spirit of the invention and the scope of the appended claim:

Having thus described the invention, what I claim as new is:—

An automobile signal comprising a substantially rectangular casing having an open top, a hinged cover therefor, the rear face of said casing having an enlarged opening provided therein, a transparency disposed over said opening, a pair of aligned sleeves extending inwardly from the opposite ends of the casing, a substantially rectangular hollow drum adapted for rotation in the casing, trunnions supported in the respective sleeves, one of said trunnions providing a bearing for the drum, a shaft keyed to the other trunnion and secured at one end to the opposite end of the drum, an operating handle on the outer end of said shaft for rotating the drum, each face of said rectangular drum having an opening provided therein, a glass panel for each of said openings, said panels having signalling indicia thereon, each of said glass panels in the side faces of the drum being adapted to be moved into alignment with the opening and transparency provided in the rear face of the casing for displaying said signalling indicia.

In testimony whereof I affix my signature.

THOMAS McLEOD KERR.